United States Patent
Kelly et al.

(10) Patent No.: US 10,019,329 B2
(45) Date of Patent: *Jul. 10, 2018

(54) IN-LINE BACKUP POWER SOURCE INCORPORATING COMMUNICATION CAPABILITY

(71) Applicant: International Business Machines Corporation, Armonk, NY (US)

(72) Inventors: Peter W. Kelly, Stone Ridge, NY (US); Shankar K M, Bangalore (IN); Mahendra Krishna Mavilla Venkata, Bangalore (IN); Kiruthikalakshmi Periasamy, Erode (IN)

(73) Assignee: International Business Machines Corporation, Armonk, NY (US)

(*) Notice: Subject to any disclaimer, the term of this patent is extended or adjusted under 35 U.S.C. 154(b) by 131 days.

This patent is subject to a terminal disclaimer.

(21) Appl. No.: 15/146,920

(22) Filed: May 5, 2016

(65) Prior Publication Data

US 2017/0038811 A1    Feb. 9, 2017

Related U.S. Application Data

(63) Continuation of application No. 14/819,484, filed on Aug. 6, 2015, now Pat. No. 9,760,452.

(51) Int. Cl.
G06F 11/00    (2006.01)
G06F 11/20    (2006.01)
(Continued)

(52) U.S. Cl.
CPC ............ *G06F 11/2015* (2013.01); *G06F 1/28* (2013.01); *G06F 1/30* (2013.01); *G06F 11/3006* (2013.01);
(Continued)

(58) Field of Classification Search
USPC ........ 714/14, 15, 16, 13, 22, 23, 24; 713/330
See application file for complete search history.

(56) References Cited

U.S. PATENT DOCUMENTS

| | | |
|---|---|---|
| 5,367,697 A | 11/1994 | Barlow et al. |
| 7,263,620 B2 | 8/2007 | Bresniker et al. |
| (Continued) | | |

FOREIGN PATENT DOCUMENTS

JP    4408028 B2    2/2010

OTHER PUBLICATIONS

McCluer, et al., "Comparing Data Center Batteries, Flywheels, and Ultracapacitors", Schneider Electric—Data Center Science Center, White Paper 65, Revision 2, 16 pages, Published Dec. 2008, <http://www.apcmedia.com/salestools/DBOY-77FNCT/DBOY-77FNCT_R2_EN.pdf?sdirect=true>.

(Continued)

*Primary Examiner* — Dieu-Minh Le
(74) *Attorney, Agent, or Firm* — Daniel R. Simek

(57) ABSTRACT

A method for providing backup power to power loads. The method includes a computer processor identifying an indication of a power failure to a computing system. The method further includes identifying a first active power load that is imposed on the computing system by one or more computing devices in the computing system. The method further includes responding to the power failure by activating a first IPU that is connected to the first active power load, identifying a power duration threshold for the first active power load, and determining whether a duration of power stored in the first IPU is less than the identified power duration. The method further includes responding to the determination that the duration of power stored in the first IPU is less than the (Continued)

identified power duration threshold of the first active power load by initiating a shutdown protocol for the first active power load.

10 Claims, 6 Drawing Sheets

(51) Int. Cl.
*G06F 11/30* (2006.01)
*G06F 1/28* (2006.01)
*G06F 1/30* (2006.01)

(52) U.S. Cl.
CPC .... *G06F 11/3058* (2013.01); *G06F 2201/805* (2013.01)

(56) References Cited

U.S. PATENT DOCUMENTS

| | | | |
|---|---|---|---|
| 7,836,339 B2* | 11/2010 | Leete | H04L 1/22 714/22 |
| 8,201,009 B2 | 6/2012 | Sun et al. | |
| 8,674,823 B1 | 3/2014 | Contario et al. | |
| 9,429,599 B1* | 8/2016 | Contario | H02J 1/10 |
| 9,692,231 B2* | 6/2017 | Nguyen | H02J 3/006 |
| 2010/0299548 A1 | 11/2010 | Chadirchi et al. | |
| 2013/0076132 A1 | 3/2013 | Cohen et al. | |
| 2015/0074431 A1* | 3/2015 | Nguyen | H02J 3/006 713/300 |
| 2015/0227181 A1* | 8/2015 | Khessib | G06F 1/263 713/300 |
| 2017/0294778 A1* | 10/2017 | Nguyen | H02J 3/006 |

OTHER PUBLICATIONS

"Automatically Shutdown Multiple Servers After a Power Failure", Sep. 16, 2010, 7 pages, <http://www.drennanit.com/automatically-shutdown-multiple-servers-after-a-power-failure/>.

"Backup Power and UPS", © 2015, Maxwell Technologies, Inc., printed on Apr. 22, 2015, 2 pages, <http://www.maxwell.com/solutions/power-grid/behind-the-meter/behind-the-meter-ups-backup-systems>.

List of IBM Patents or Patent Applications Treated as Related, Appendix P, Filed Herewith.

Kelly, et al., U.S. Appl. No. 14/819,484, filed Aug. 6, 2015.

* cited by examiner

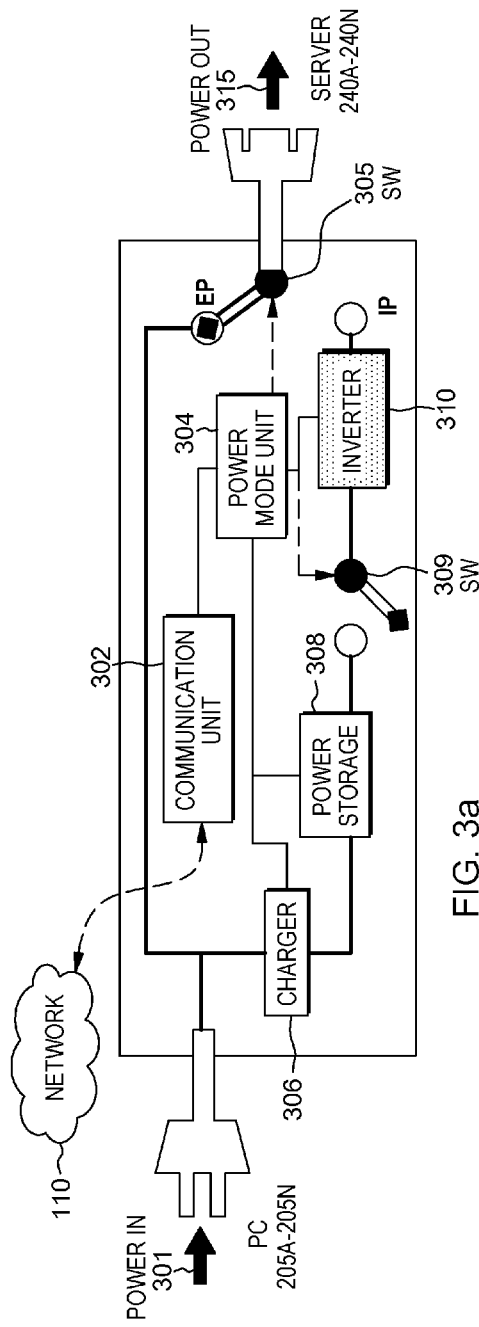
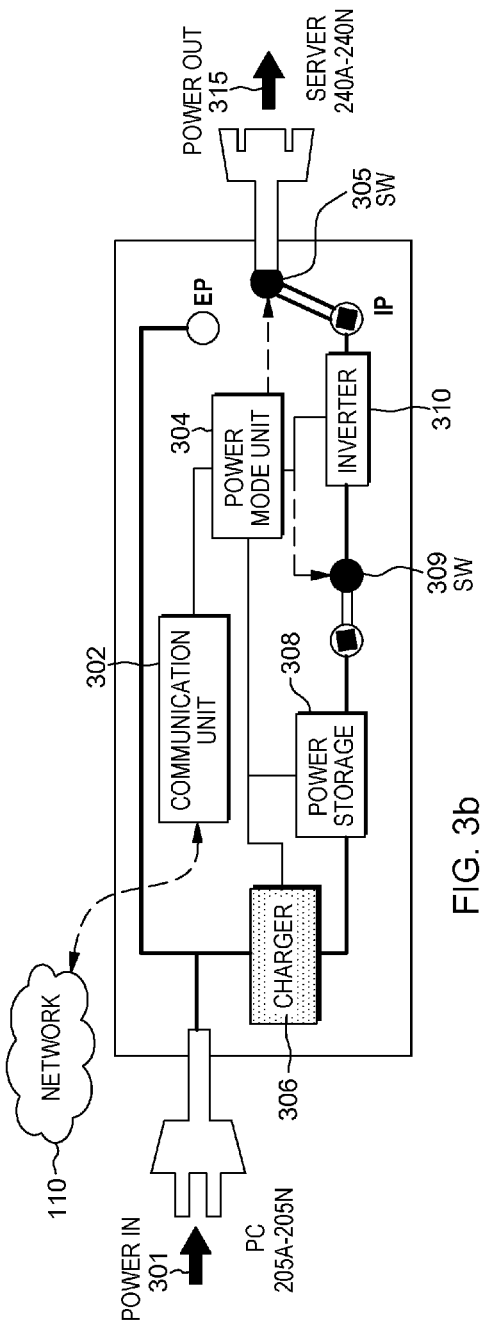
FIG. 3a
FIG. 3b

IN-LINE BACKUP POWER SOURCE INCORPORATING COMMUNICATION CAPABILITY

BACKGROUND OF THE INVENTION

The present invention relates to the field of backup power sources, and more particularly to backup power sources for computer hardware.

The size and complexity of computing networks and data centers has rapidly grown, and the number of servers and other devices within these data centers has expanded greatly. Business requirements changed introducing multiple operating systems, optimized hardware configurations, more rapid application development cycles, and requirements for high reliability and availability. The cost, size, energy consumption, and complexity of data centers built around individual servers, personal computers (PCs), storage devices, etc., became prohibitive to maintain. Data centers have evolved away from individual servers and PCs to rack-mounted "blade" server "farms" and computing clusters. To increase the speed of execution of software programs, improve security, and search databases of increasing size and complexity, software programs often execute different tasks (e.g., modules, functions, transactions, etc.) on servers and other computing hardware optimized for that type of transaction. Examples of servers optimized for specific tasks are: database servers, file servers, mail servers, print servers, web servers, rendering (e.g., graphics) servers, and application servers.

Data centers utilize various strategies to obtain goals, which include high reliability, high availability, preventing data loss or corruption, and avoiding negative customer experiences. One strategy is utilizing uninterruptable power supplies (UPS) to support the operations of the data center (e.g., servers). When power failures occur, UPS s can support the data center from minutes to hours until backup power is activated (e.g., emergency generators), or the primary power supply (e.g., grid power) is restored. A second strategy is to monitor available backup power and to "gracefully" shut down servers and other aspects of the data center in a controlled fashion to minimize customer impacts and prevent data loss or corruption. A graceful shutdown may include preventing additional tasks or requests from initiating, completing transactions in progress, saving data, suspending network activity, pausing the server, and powering off a server.

SUMMARY

According to an aspect of the present invention, there is a method, computer program product, and/or system for providing backup power to power loads. The method includes one or more computer processors identifying an indication of a power failure to a computing system. The method further includes identifying a first active power load that is imposed on the computing system by one or more computing devices in the computing system, wherein the first active power load is affected by the identified power failure to the computing system. The method further includes responding to an identification of the indication of the power failure by activating a first in-line power unit (IPU) that is connected to the first active power load, wherein the first IPU supplies power to the first active power load. The method further includes identifying a power duration threshold for the first active power load. The method further includes determining whether a duration of power stored in the first IPU is less than the identified power duration of the first active power load. The method further includes responding to a determination that the duration of power stored in the first IPU is less than the identified power duration threshold of the first active power load by initiating a shutdown protocol for the first active power load.

BRIEF DESCRIPTION OF THE DRAWINGS

FIG. 3a depicts an illustrative example of an in-line power unit operating in an external power mode, in accordance with an embodiment of the present invention.

FIG. 3b depicts an illustrative example of an in-line power unit operating in an internal power mode, in accordance with an embodiment of the present invention.

DETAILED DESCRIPTION

Figure 1:
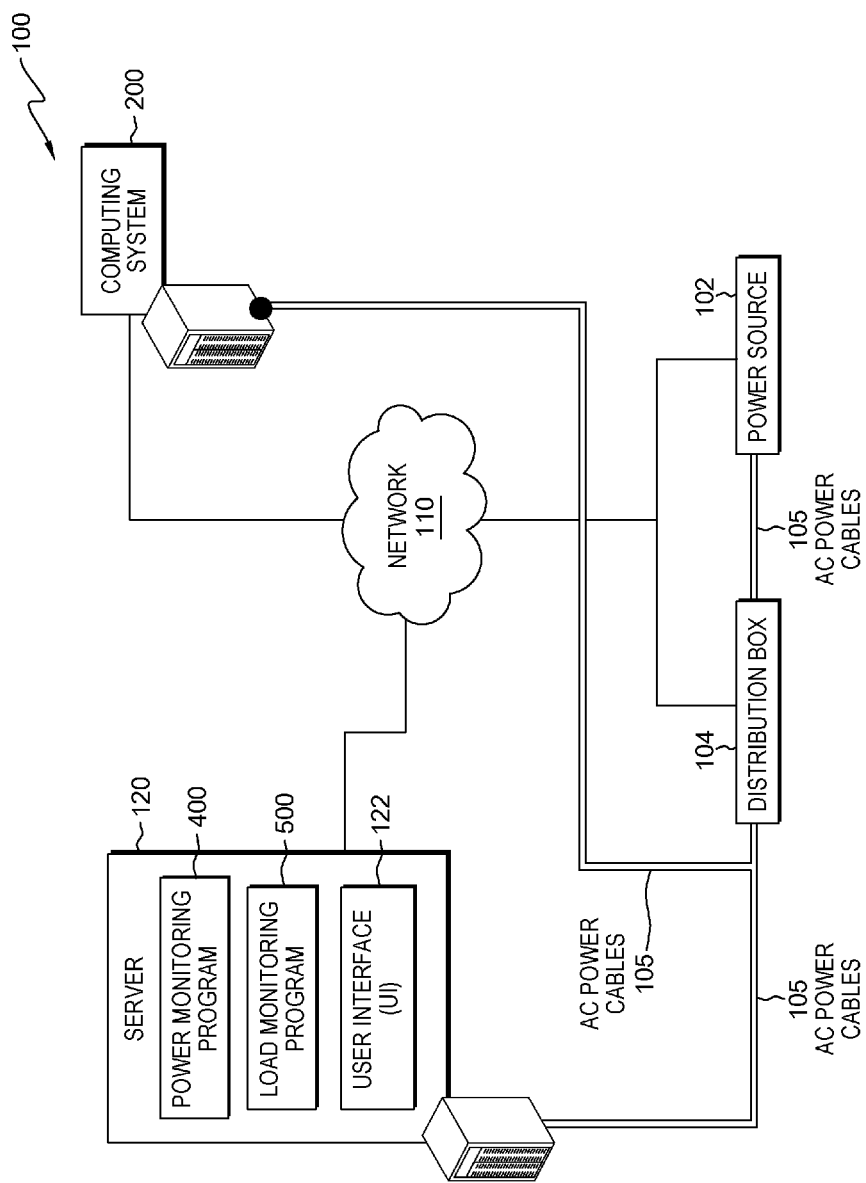
FIG. 1 illustrates a computing environment incorporating a computing system utilizing in-line power units, in accordance with an embodiment of the present invention.

Embodiments of the present invention recognize that uninterruptible power supply (UPS) units can provide backup power to a plurality of computing devices (e.g., servers, networking units, direct access storage devices (DASD), etc.) within a computing system when power failures occur. A UPS unit is generally sized to have power capacities greater than the power loads that the UPS unit supports. Installing a UPS unit with a higher initial power capacity compensates for the degradation of the batteries utilized by the UPS unit.

Data centers utilizing UPS units incur initial costs for: the UPS units, floor space occupied by the UPS units, and infrastructure that supports the UPS units. Some UPS units may not be modular. Increasing the UPS capacity when additional loads/power consumers (e.g., servers, networking units, DASD, etc.) are added is not trivial, and significant incremental costs may be incurred. Additional ongoing costs are associated with the maintenance, health, and environmental monitoring of the UPS units. In addition, UPS units may not protect computing devices from point-source power failures (e.g., faults) that may occur between a UPS, a power distribution system, and a rack distribution unit supplying power to a plurality of computing devices.

Embodiments of the present invention utilize in-line power units (IPU) as backup power sources that are plug/connection-compatible with utilized AC power cords (e.g., AC power cables) installed between a rack distribution unit (RDU) and a computing device. In some embodiments, an IPU may be designed as (e.g., integrated within) a power cable (e.g., a super power cable). In other embodiments, an IPU may be designed as a module utilizing AC power cables that is configured between the RDU and the power connection for a computing device. In another embodiment, the IPU may be configured between a power distribution box and the RDU of a computing system. In addition, embodiments of the present invention include communication (e.g., broadcast) capabilities to initiate electronic shutdown protocols (e.g., graceful shutdown) of devices, such as servers. A graceful shutdown of a computing device may include: inhibiting new computing activity, the completion of current computing activities, the storage/backup of information, pausing of operations, and terminating (e.g., shutting down) one or more software programs prior to powering off the computing device (e.g., server).

Embodiments of the present invention also recognize that the loss of an external power source may result in the loss of general network communications. In one embodiment, the monitoring and control aspects of the present invention may be implemented on a central server supporting a plurality of rack-mounted computing systems. In another embodiment, the monitoring and control aspects of the present invention may be locally configured to execute on a server within each rack-mounted computing system.

In some embodiments, the monitoring and control aspects of the present invention may be implemented on a mobile computing device, such as a table computer, which can communicate wired or wirelessly with the IPUs, servers (e.g., power loads), and individual rack-mounted computing systems. For example, a tablet computer may allow a data center administrator to access rack-mounted computing systems that may lose network connectivity due to an interruption (e.g., failure) of the supply of power to a data center. In a further embodiment of the present invention, the monitoring and control may be decentralized and stored in the non-volatile storage (e.g., flash memory) and execute on the microcontroller that is included in an IPU. In some embodiments, the IPUs may communicate (e.g., wirelessly) among other IPUs, and the power loads (e.g., servers) respectively supported by the IPUs to coordinate the graceful shutdown of power loads that may interact on an operational level. For example, an e-commerce software application may utilize: a web server, a database server, a file server, and an e-mail server. The sequencing of the shutdown of the servers supporting this distributed e-commerce software application is important to prevent data loss or corruption.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating a computing environment incorporating a computing system utilizing in-line power units, in accordance with the present invention. In an embodiment, computing environment 100 includes power source 102, distribution box 104, alternating current (AC) power cables 105, server 120, and computing system 200. Distribution box 104, alternating current (AC) power cables 105, server 120, and computing system 200 may be interconnected over network 110. In another embodiment, power source 102 may also communicate with network 110. Many modifications to the depicted environment may be made by those skilled in the art without departing from the scope of the invention as recited by the claims. In some embodiments, AC power sources and AC power cables may be replaced with direct current (DC) equivalents.

Power source 102 is an AC power source supplying power to computing environment 100. Power source 102 may include: a grid-based power source, an on-site power source (e.g., backup generator, solar power, fuel cells, wind power, tidal power, etc.), and an UPS. In some embodiments, power source 102 may utilize network 110 to communicate status information. For example, when computing environment 100 utilizes power supplied by UPS units, the UPS units may provide information related to power storage capacity.

Distribution box 104 distributes and routes power from power source 102 to: network 110, server 120, computing system 200, and other electrical devices (not shown) within computing environment 100. In some embodiments, distribution box 104 includes: fuses, circuit breakers, surge protectors, power monitoring devices (e.g., power factor, energy consumption, voltage, etc.), electrical connections (e.g., for AC power cables 105), manual switches, automatic switches, etc. In other embodiments, distribution box 104 may also include: step-down transformers, power conditioning units, environmental monitors, network connections (e.g., WAN, LAN, etc.), and alarm systems. In addition, distribution box 104 may communicate state information (e.g., energy consumption, environmental factors, distribution connections, etc.) to one or more computing systems or electronic devices and communicate status information with power source 102 via network 110.

AC power cables 105 transfer power from distribution box 104 to server 120, computing system 200, and various electronic devices (not shown) within computing environment 100. AC power cables 105 may also transfer power from power source 102 to distribution box 104. AC power cables 105 may be connected to power source 102, distribution box 104, server 120, computing system 200, and various electronic devices via hardwiring, plug-socket connectors, etc., or any combination thereof.

Server 120 may be a laptop computer, a tablet computer, a netbook computer, a personal computer (PC), a desktop computer, a personal digital assistant (PDA), a smart phone, a wearable device (e.g., digital eyeglasses, smart glasses, a smart watch), or any programmable computer system known in the art. In certain embodiments, server 120 represents computer systems utilizing clustered computers and components (e.g., database server computers, application server computers, file server computers, network-attached storage devices, etc.) that act as a single pool of seamless resources when accessed through network 110, as is common in data centers and with cloud-computing applications. In general, server 120 is representative of any programmable electronic device or combination of programmable electronic devices capable of executing machine readable program instructions and communicating with power source 102 and computing system 200 via network 110. Server 120, power source 102, and computing system 200 may include components, as depicted and described in further detail with respect to FIG. 6, in accordance with embodiments of the present invention.

In one embodiment, power source 102, distribution box 104, server 120, computing system 200 (described in further detail in FIG. 2), and the IPUs (described in further detail in FIG. 2 and FIG. 3) communicate utilizing network 110. In some embodiments, server 120 may communicate with the components (e.g., IPUs, RDUs) within computing system 200 utilizing network 110. Network 110 can be, for example, a local area network (LAN), a telecommunications network, a wireless local area network (WLAN), a wide area network (WAN), such as the Internet, or any combination of the previous, and can include wired, wireless, or fiber optic connections. In general, network 110 can be any combination of connections and protocols that will support communications between server 120 and computing system 200, in accordance with embodiments of the present invention. In another embodiment, network 110 operates locally via wired, wireless, or optical connections and can be any combination of connections and protocols (e.g., near field communication (NFC), laser, infrared, etc.). In some embodiments, network 110 may include Radio Frequency Integrated Circuits (RFIC) to communicate with various components via power-line networking (PLN) or power-line communications (PLC) utilizing AC power cables 105 and the IPUs.

Server 120 may include user interface (UI) 122, power monitoring program 400, load monitoring program 500, various network communication programs (not shown), and data storage (not shown). A user (e.g., a system administrator) of server 120 can interact with server 120 and UI 122 utilizing a singular device, such as a touch screen (e.g., display) that performs both as an input to a graphical user interface (GUI) and as an output device (e.g., a display) that presents a plurality of icons associated with software applications or images depicting the executing software applications. Optionally, a software application (e.g., a web browser) on another computing device (not shown) can access and monitor server 120 via network 110. In some embodiments, UI 122 may be installed on another computing device, such as computing system 200 or a mobile computing device (not shown), such as a tablet computer. In one example, a tablet computer utilizing UI 122 may wirelessly access network 110 to determine the status of components (e.g., power source 102, distribution box 104, server 120, computing system 200) of computing environment 100. In another example, a tablet computer utilizing UI 122 may wirelessly access the IPUs within computing system 200 and obtain status information without utilizing network 110. UI 122 accepts input from a plurality of input/output (I/O) devices (not shown) including, but not limited to, a tactile sensor interface (e.g., a touch screen, a touchpad) or a natural user interface (e.g., voice control unit, motion capture device, etc.). An I/O device can be connected to server 120 which may operate utilizing wired (e.g., USB port) or wireless network communications (e.g., infrared, NFC, etc.). For example, an I/O device may be a peripheral, such as a keyboard, a mouse, a trackball, and a click wheel that provides input from a user.

Power monitoring program 400 determines the status of the power sources that supply AC power to power loads (e.g., computing devices) included in computing system 200, and the status of each of the power loads (e.g., computing devices). Power monitoring program 400 activates one or more IPUs of computing system 200 when power source 102 fails or when the RDU (described in further detail in FIG. 2) of computing system 200 fails to supply AC power to one or more power loads of computing system 200. In addition, power monitoring program 400 monitors the power level of each IPU supplying backup power to a power load within computing system 200. In response to a determination that a power level of an IPU decreases to a power level that sustains a power load for less than a threshold duration, power monitoring program 400 activates a shutdown protocol for the related power load. In some embodiments, power monitoring program 400 communicates with load monitoring program 500 to determine whether a status of one or more power loads modifies (e.g., prioritizes, dictates, overrides) the shutdown threshold of other power loads.

Load monitoring program 500 receives status information associated with the status of power sources supplying AC power to computing system 200 and the status of the power loads of computing system 200 from power monitoring program 400. Load monitoring program 500 subsequently determines operational hierarchies for the active power loads included in computing system 200 and interactions between software applications executing on active power loads of computing system 200. Load monitoring program 500 also determines one or more internal power duration thresholds and shutdown protocols for each active power load and transmits the information to power monitoring program 400.

Figure 2:
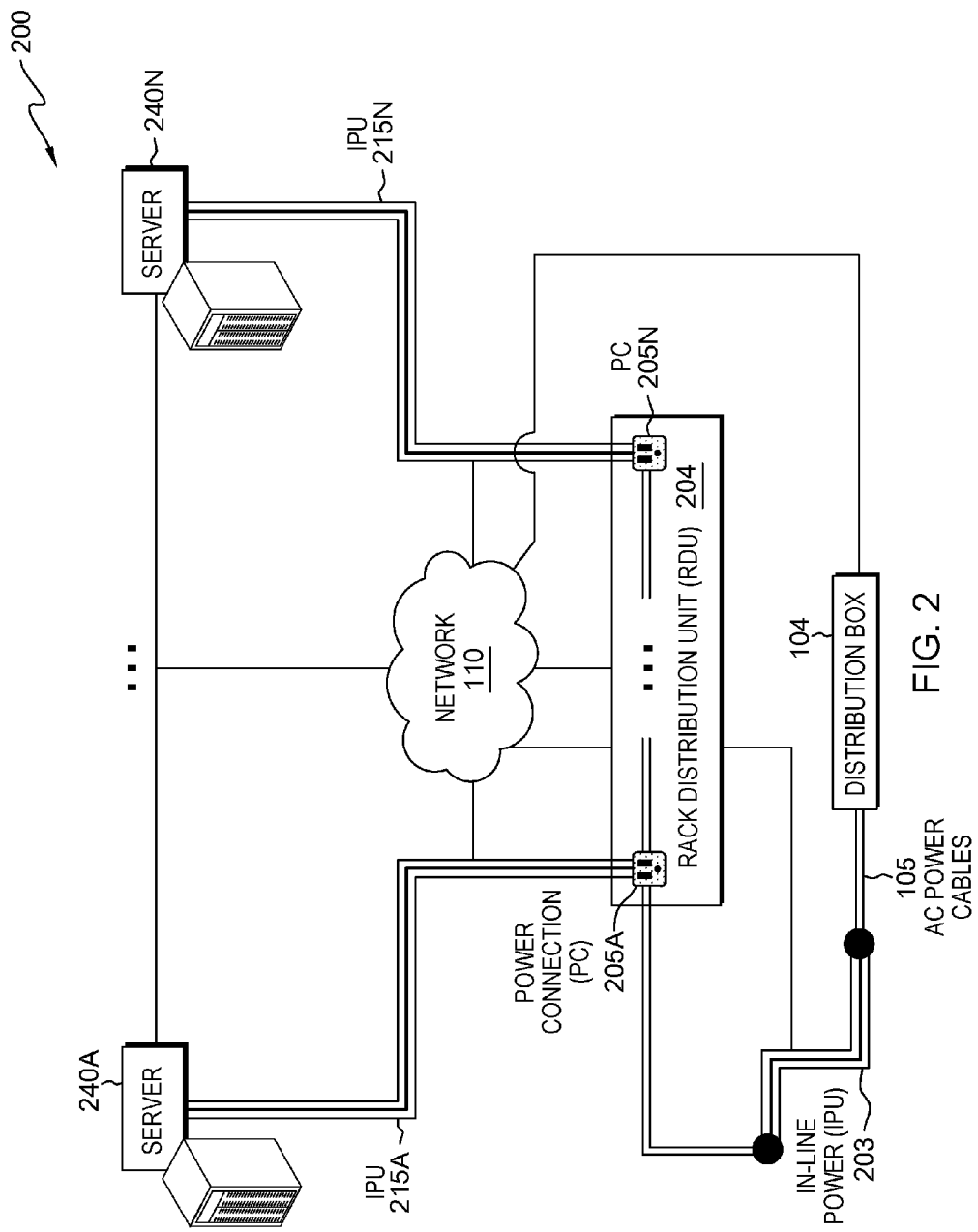
FIG. 2 depicts an illustrative example of a computing system comprised of multiple servers each supported by an in-line power unit, AC power distribution, and associated network connection to enable electronic shutdown of the servers, in accordance with an embodiment of the present invention.

FIG. 2 depicts an illustrative example of computing system 200 comprised of multiple servers (240A thru 240N), each supported by an in-line power unit (IPU) (215A thru 215N), a rack distribution unit (RDU) 204 (e.g., an AC power distribution system), and associated network connections to enable electronic shutdown of the servers, in accordance with an embodiment of the present invention. Computing system 200 may include components, as depicted and described in further detail with respect to FIG. 6, in accordance with embodiments of the present invention.

In an embodiment, computing system 200 receives AC power from distribution box 104 via AC power cables 105 directly to rack distribution unit (RDU) 204. In another embodiment, computing system 200 includes a backup power source (e.g., IPU 203) in series with AC power cables 105 and RDU 204. In some embodiments, the components of computing system 200 are incorporated within an enclosure (e.g., rack unit). In other embodiments, computing system 200 may be comprised of rack-mounted devices and stand-alone devices.

IPU 203 and IPU 215A thru IPU 215N are in-line power units (described in further detail in FIG. 3a and FIG. 3b). In one embodiment, IPU 203 has a different power storage capacity than IPU 215A thru IPU 215N. In another embodiments, IPU 203 has the same power storage capacity as IPU 215A thru IPU 215N. IPU 203 and IPU 215A thru IPU 215N may include components, as depicted and described in further detail with respect to FIG. 6, in accordance with embodiments of the present invention.

An IPU is configured to receive commands, information, and programs. The IPU may respond with status and state information. In one embodiment, IPU 203 operates independent of IPU 215A thru IPU 215N. In another embodiment, IPU 203 operates in conjunction with IPU 215A thru IPU 215N. In one example, AC power is lost to distribution box 104, and IPU 215A thru IPU 215N activate. Subsequently, IPU 215F communicates a state of near depletion to power monitoring program 400; however, server 240F has not fulfilled the dictates of a shutdown protocol and indicates the need for additional time and AC power. Power monitoring program 400 may activate the internal power mode for IPU 203 and switch IPU 215F to external power mode, the AC power being supplied by IPU 203 as opposed to power source 102. In another example, AC power is lost to distribution box 104 and IPU 203, and IPU 215A thru IPU 215N activate. IPU 203 supplies AC power to RDU 204 to maintain network 110. IPU 215A thru IPU 215N supply power to server 240A thru server 240N respectively.

Rack distribution unit (RDU) 204 respectively supplies AC power to server 240A thru server 240N via IPU 215A thru IPU 215N. IPU 215A thru IPU 215N are respectively connected to power connection (PC) 205A thru PC 205N of RDU 204. In some embodiments, RDU 204 includes basic electrical functions, such as power distribution, overload management (e.g., power breakers), power line surge protection, and power line noise filtering. In other embodiments, RDU 204 may further include: status indicators, wireless network connections, wired network connections (e.g., LAN, RS-232, etc.), fiber optic connections, persistent storage (e.g., a flash memory device), environmental monitoring sensors, and voltage and current monitoring for power connections 205A thru 205N.

Power connection (PC) 205A thru PC 205N are connections that supply AC power to respective power loads (e.g., server 240A thru server 240N) of computing system 200 via IPU 215A thru 1PU 215N.

Server 240A thru server 240N are representative of any computing devices that may be stand-alone devices (e.g., servers) or rack-mounted devices, such as blade-severs, routers, fiber channel switches, DASD units, network-attached storage (NAS), etc.

FIG. 3a depicts an illustrative example of an in-line power unit operating in an external power mode, in accordance with an embodiment of the present invention.

In one embodiment, FIG. 3a is representative of respective instances of IPU 215A thru IPU 215N. In another embodiment, FIG. 3a is representative of IPU 203. In some embodiments, an IPU is comprised of: power in 301, communication unit 302, power mode unit 304, SW 305, charger 306, power storage 308, SW 309, inverter 310, and power out 315.

IPU 215A thru IPU 215N may be direct replacements for AC power cords that supply AC power (e.g., connect) from RDU 204 to server 240A thru server 240N. Power in 301 is a power connection compatible connecting to PC 205A thru PC 205N of RDU 204. Power out 315 is a power connection compatible with AC power input connections of server 240A thru 240N. In one embodiment, power in 301 is a plug, and power out 315 is a socket. In other embodiments, power in 301 and power out 315 are electrical connection configurations: provided by a manufacturer, specified by a user (e.g., data center), and/or dictated by a governmental entity (e.g., safety regulations).

Power in 301 is an AC electrical connector. In one embodiment, power in 301 is a connector that enables an IPU to connect to an AC power source. For example, IPU 203 connects to distribution box 104. In another embodiment, power in 301 is an electrical connector that enables an IPU to connect to an AC power distribution unit. In another example, IPU 215A connects to RDU 204 via PC 205A.

Communication unit 302 is an electronic device that enables communication between network 110 and an IPU. The communication connection may be wired, wireless, or fiber optic-based and utilize connection types and protocols describe with reference to network 110. In an embodiment, communication unit 302 interfaces with power mode unit 304. Information communicated by communication unit 302 may include: commands received from power monitoring program 400, status and state data communicated to power monitoring program 400, status and state data communicated among IPUs and power loads, information from power source 102. In one embodiment, communication unit 302 receives commands from power monitoring program 400 executing on server 120, via network 110, to utilize external power mode. In another embodiment, communication unit 302 enables IPUs to communicate among each other and among the power loads that the IPUs support. Communication unit 302 interfaces power mode unit 304 with devices attached to network 110.

Power mode unit 304 controls the functions of switch (SW) 305, switch (SW) 309, charger 306, and inverter 310. Power mode unit 304 may include power regulation electronics to convert power from power storage 308 to power levels utilized by communication unit 302, power mode unit 304, SW 305, and SW 309. For example, an IPU receives one or more commands from power monitoring program 400 to operate in external power mode. Power mode unit 304 subsequently switches SW 305 to the EP position enabling external AC power from power source 102 to flow from RDU 204, via power in 301, to an electronic device (e.g., a server), via power out 315, within computing system 200. Concurrently, power mode unit 304 disables inverter 310 (stipple shading) and opens SW 309 to prevent power loss from power storage 308. In an embodiment, power mode unit 304 includes a variety of sensors that gather state information on one or more components of the IPU, such as charger 306, power storage 308, and SW 305. Examples of state information include voltage, current, and temperature. Power mode unit 304 may utilize the state information to ensure that charger 306 maintains power storage 308 without overcharging power storage 308.

In another embodiment, power mode unit 304 communicates the state information to server 120 via network 110. In some embodiments, power mode unit 304 includes a microcontroller that can store and execute programs (e.g., power monitoring program 400, load monitoring program 500, a firmware equivalent of power monitoring program 400 and/or load monitoring program 500). For example, as a contingency for server 120 losing power, server 120 periodically utilizes load monitoring program 500 to generate lists comprised of threshold information, shutdown protocols, override commands, and operational interactions that are customized for each IPU/server configuration.

In the depicted embodiment, SW 305 connects power in 301 (e.g., AC power) to power out 315, via connection EP, when an IPU operates in external power mode.

Charger 306 converts AC power to direct current (DC) power. The DC power is subsequently stored on power storage 308. Charger 306 may include power regulation electronics to convert power from power in 301 to power levels utilized by communication unit 302, power mode unit 304, SW 305, and SW 309. In an embodiment, power mode unit 304 activates charger 306 to recharge power storage 308 after a server of computing system 200 utilizes the internal power mode of an IPU. In another embodiment, power mode unit 304 trickle charges power storage 308 to maintain power storage 308 at maximum charge. In some embodiments, charger 306 may be activated/deactivated as needed to maintain power storage 308 without overcharging power storage 308.

In a different embodiment, charger 306 obtains power to recharge power storage 308 from an external source as opposed to power in 301. In one scenario, charger 306 obtains DC power from an external source (e.g., a DC power supply within computing system, solar cells, etc.) to recharge power storage 308. In another scenario, charger 306 obtains AC power from an external source (e.g., inductive charging, inductive coupling) to recharge power storage 308.

Power storage 308 stores DC power for subsequent conversion to AC power by inverter 310. Power storage 308 may include: batteries, supercapacitors, ultracapacitors, fuel cells, electrical power storage devices known in the art, or any combination thereof.

In the depicted embodiment, SW 309 is open to prevent power loss from power storage 308 through inverter 310. Inverter 310 is an electronic device that utilizes DC power as input and provides AC power as an output. In an embodiment, utilizing external power, inverter 310 is disabled (stipple shading).

Power out 315 is an AC electrical connector. In one embodiment, power out 315 is a connector that enables an IPU to connect to a power load within computing system 200 (e.g., server 240A). In another embodiment, power out 315 is a connector that enables an IPU 203 to connect to RDU 204 of computing system 200.

FIG. 3b depicts an illustrative example of an in-line power unit operating in an internal power mode, in accordance with an embodiment of the present invention.

Power in 301 is an AC electrical connector that enables an IPU to connect to an AC power source. In an instance, power in 301 is not supplying power to an IPU. For example, power source 102 may be offline.

Communication unit 302 is an electronic device that enables communication between network 110 and an IPU. In addition, communication unit 302 interfaces with power mode unit 304. In an embodiment, communication unit 302 receives commands from power monitoring program 400, via network 110, executing on server 120 to utilize internal power mode. In one example, power source 102 ceases to provide power to computing system 200. In another example, power monitoring program 400 determines that a simple-point failure (e.g., PC 205A) occurs on RDU 204. Power monitoring program 400 communicates with communication unit 302 of IPU 215A to utilize internal power mode. Communication unit 302 interfaces power mode unit 304 with devices attached to network 110. In some embodiments, communication unit 302 enables IPU 203, IPU 215A thru IPU 215N, RDU 204, and server 240A thru server 240N to communicate and function if network communications with server 120 ceases (e.g., server 120 loses power). In other embodiments, communication unit 302 may also enable communication with other devices within computing environment 100, such as RDU 204 and power source 102.

Power mode unit 304 controls the functions of SW 305, SW 309, charger 306, and inverter 310. For example, when an IPU receives a command to operate in internal power mode, communication unit 302 communicates the command to power mode unit 304. Power mode unit 304 closes SW 309 to connect power storage 308 (e.g., a DC power source) to inverter 310. Concurrently, SW 305 moves to the IP position enabling inverter 310 to provide AC power to power out 315. Power mode unit 304 disables charger 306 (stipple shading). In an embodiment, power mode unit 304 interfaces with a variety of sensors that gather state information on one or more components of the IPU, such as SW 305, power storage 308, SW 309, and inverter 310. Examples of state information include: voltage, current, temperature, and the position of a switch (SW).

In one embodiment, power mode unit 304 transmits the state information to power monitoring program 400 to estimate a remaining internal power duration for an IPU. In another embodiment, power mode unit 304 includes a microcontroller that can estimate a remaining internal power duration for the IPU. Power mode unit 304 communicates the remaining internal power duration for the IPU to server 120 via network 110. In some embodiments, power mode unit 304 includes a microcontroller that can store (e.g., in RAM, in ROM, in flash memory) and execute programs (e.g., power monitoring program 400, load monitoring program 500, a firmware equivalent of power monitoring program 400 and load monitoring program 500). For example, as a contingency for server 120 losing power, server 120 periodically utilizes load monitoring program 500 to generate lists comprised of threshold information, shutdown protocols, override commands, and operational interactions that are customized for each IPU/server configuration and downloaded to power mode unit 304 of the respective IPU.

In the depicted embodiment, SW 305 connects inverter 310 (e.g., AC power) to power out 315, via connection IP, when an IPU operates in internal power mode.

Charger 306 is deactivated (stipple shading) by power mode unit 304. Charger 306 may include switches (e.g., mechanical, semiconductor) to prevent power loss resulting from the backflow of DC power from power storage 308 to charger 306.

Inverter 310 is an electronic device that utilizes DC power provided by power storage 308 and outputs AC power to one or more components or systems of computing system 200. Inverter 310 may include power regulation electronics to convert power from power storage 308 to power levels utilized by communication unit 302, power mode unit 304, SW 305, and SW 309. In an embodiment, inverter 310 is enabled (e.g., activated) by power mode unit 304 to provide AC power.

Figure 4:
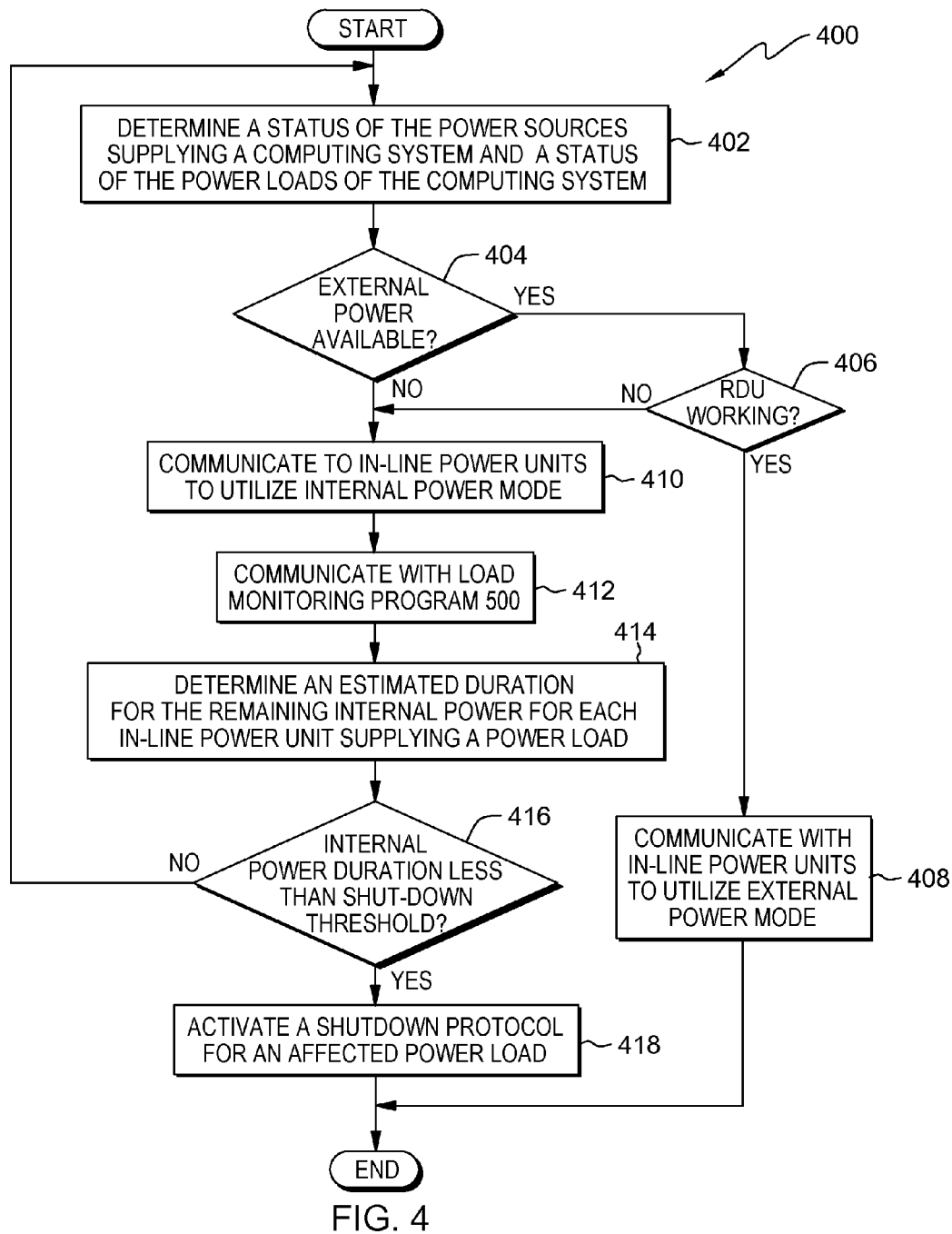
FIG. 4 depicts a flowchart of the operational steps of a power monitoring program, in accordance with an embodiment of the present invention.

FIG. 4 is a flowchart depicting operational steps for power monitoring program 400, a program for monitoring the status of power sources supplying AC power to a computing system and monitoring the loads within the computing system consuming the AC power, in accordance with embodiments of the present invention. In addition, power monitoring program 400 initiates a shutdown protocol for a power load when the duration of power within an IPU sustains the power load for less than a threshold value.

In step 402, power monitoring program 400 determines a status of the power sources supplying a computing system and a status of the power loads of a computing system (e.g., computing system 200). In one embodiment, power monitoring program 400 utilizes network 110 to determine that power source 102 (e.g., external power) is supplying power to computing system 200 via AC power cables 105. In addition, power monitoring program 400 can determined whether RDU 204 is working and supplying AC power to server 240A thru server 240N. In some scenarios, power monitoring program 400 may determine, via network 110, which power connections (e.g., PC 205A thru PC 205N) of RDU 204 are supplying power to respective instances of server 240A thru server 240N. In other scenarios, power monitoring program 400 can utilize information obtained from IPU 215A thru IPU 215N respectively to determine which servers, 240A thru 240N, are supplied power by RDU 204. In another embodiment, power monitoring program 400 determines the status of each IPU (e.g., IPU 215A thru IPU 215N) via network 110. The status of an IPU may include: charging, discharging, an internal power level, a power mode, and an external power level.

In some embodiments, power monitoring program 400 receives status information transmitted by the AC power sources and by the power loads of computing system 200 to server 120 via network 110. In some scenarios, power monitoring program 400 receives the status information at a constant rate. In other scenarios, power monitoring program 400 receives the status information at various rates. For example, while IPU 215G has sufficient power for a supply duration 1.25× that of the shutdown threshold duration for server 240G, power monitoring program 400 receives status information at a rate of once per 20 seconds. When the power supply duration associated with IPU 215G drops below 1.25× that of the shutdown threshold duration for server 240G, power monitoring program 400 receives status information at a rate of once per 5 seconds. In another example, power monitoring program 400 may receive a status of "shutdown" when a server completes a graceful shutdown.

Referring to step 402, power monitoring program 400 may additionally determine a status for each of the power loads of computing system 200. The status of power loads may include: active, paused, off, and shutdown in progress.

In decision step 404, power monitoring program 400 determines whether external power is available for computing system 200. In one embodiment, power monitoring program 400 utilizes status information determined (in step 402) for computing system 200 to determine whether external power is available. In another embodiment, power monitoring program 400 communicates with power source 102 to determine whether external power is available. In a different embodiment, power monitoring program 400 determines that an override command is issued dictating that one or more IPUs switch from internal power mode to external power mode. For example, power monitoring program 400 determines that IPU 215F is nearly depleted of power and server 240F is not shut down. Power monitoring program 400 may activate the internal power mode for IPU 203 and switch IPU 215F to external power mode bypassing IPU 215F internal power storage. IPU 203 supplies AC power to server 240F.

In decision step 404, responsive to determining that external power is available (yes branch, decision step 404), power monitoring program 400 determines whether the RDU (e.g., RDU 204) is working (decision step 406).

In decision step 406, power monitoring program 400 determines whether the RDU (e.g., RDU 204 of computing system 200) is working. In some embodiments, power monitoring program 400 may obtain a determination whether RDU 204 is working or not working. In other embodiments, power monitoring program 400 may obtain determinations associated with a point-of-failure condition (e.g., not working) related to a specific PC (e.g., PC 205C) within RDU 204. In some scenarios, power monitoring program 400 processes each point-of-failure determination independently. In other scenarios, power monitoring program 400 subsequently obtains an indication from load monitoring program 500 that the point-of-failure occurs on a power connection (e.g., PC 205D) that is associated with a server supporting one or more other servers within computing system 200. In one instance, power monitoring program 400 determines that RDU 204 is not working for server 240D and the servers below server 240D in a hierarchical operational structure. In another instance, power monitoring program 400 determines from an indication obtained from load monitoring program 500 that server 240D is part of a critical path. Power monitoring program 400 determines that RDU 204 is not working for servers within an operational structure that includes server 240D.

In decision step 406, responsive to a determination that the RDU (e.g., RDU 204) is working (yes branch, decision step 406), power monitoring program 400 communicates with the IPUs to utilize external power (step 408).

In step 408, power monitoring program 400 communicates with in-line power units to utilize external power mode. In one embodiment, power monitoring program 400 utilizes network 110 to communicate with IPU 215A thru IPU 215N to utilize external power. In another embodiment, power monitoring program 400 utilizes network 110 to communicate with the IPUs associated with the PCs of RDU 204 that are identified as working to utilize external power.

In a different embodiment, power monitoring program 400 determines that external power has been restored. In response, power monitoring program 400 communicates with IPU 215A thru IPU 215N of computing system 200 to switch from internal power mode to external power mode. In a further embodiment, power monitoring program 400 communicates with one or more servers, of server 240A thru server 240N that initiate a shutdown protocol, to resume operations. In some scenarios, power monitoring program 400 may restart server 240A thru server 240N once external power is restored. In other scenarios, power monitoring program 400 cannot restart one or more of server 240A thru server 240N. Other programs (not shown) control the sequencing and restart of the servers of computing system 200 prior to power monitoring program 400 resuming interactions with the servers of computing system 200.

Referring to decision step 404, in response to a determination that external power is not available (no branch, decision step 404), power monitoring program 400 communicates with the IPUs to utilize internal power mode (step 410).

Referring to decision step 406, in response to a determination that the RDU (e.g., RDU 204) is not working (no branch, decision step 406), power monitoring program 400 communicates with the IPUs to utilize internal power mode (step 410). Responsive to some determinations, power monitoring program 400 communicates with IPU 215A thru IPU 215N to utilize internal power mode. Responsive to other determinations, power monitoring program 400 communicates with IPUs associated with non-working portions of RDU 204 to utilize internal power mode.

In step 410, power monitoring program 400 communicates to in-line power units to utilize internal power mode. In some embodiments, power monitoring program 400 may communicate with each IPU providing power to an active load within computing system 200 to utilize internal power load. In other embodiments, power monitoring program 400 may communicate with IPUs associated with power loads affected by one or more failures (e.g., faults) of RDU 204 to utilize internal power load.

In step 412, power monitoring program 400 communicates with load monitoring program 500. Power monitoring program 400 communicates the status of the power sources (e.g., IPU 215A thru IPU 215N) supplying AC power to the power loads (e.g., server 240A thru server 240N) of computing system 200. Power monitoring program 400 receives status information associated with applications executing on the active power loads (e.g., server 240A thru server 240N) of computing system 200. In some embodiments, power monitoring program 400 also receives power duration threshold information for server 240A thru server 240N in addition to status information for operating power loads of computing system 200. In a further embodiment, power monitoring program 400 receives one or more shutdown protocols included with the power duration threshold information for a power load from load monitoring program 500. In some scenarios, power monitoring program 400 may receive a tiered (e.g., sequenced) selection of power duration thresholds from load monitoring program 500. The tiered selection of power duration thresholds may dictate specific shutdown protocols. For example, server 240A has an initial power duration of five minutes that dictates inhibiting incoming network activity from users utilizing applications executing on server 240A. A second power duration threshold for server 240A is set at three minutes that dictates that a graceful shutdown is initiated.

In step 414, power monitoring program 400 determines an estimated duration for the remaining internal power for each of the IPUs supplying a power load of computing system 200. In one embodiment, power monitoring program 400 utilizes information associated with one or more sensors within an IPU to calculate an estimation of a duration of power remaining in an IPU supplying AC to a power load of computing system 200. For example, power monitoring program 400 utilizes a current and voltage calculation to estimate the remaining power duration. In another embodiment, power monitoring program 400 utilizes a power/voltage relationship related to the type of power storage 308 (e.g., battery, supercapacitor, ultracapacitor, etc.) to estimate the remaining power duration for an IPU. In some embodiments, power monitoring program 400 receives an estimated duration of the remaining internal power for an IPU from power mode unit 304 of the utilized IPU.

In decision step 416, power monitoring program 400 determines whether the estimated internal power duration for an IPU is less than a shutdown threshold. In one embodiment, power monitoring program 400 utilizes individual power duration thresholds for power loads (e.g., server 240A thru server 240N) obtained from load monitoring program 500 to determine whether an estimated internal power duration for the respective IPU (IPU 215A thru IPU 215N) is less than the power duration threshold for the power load.

In another embodiment, power monitoring program 400 may utilize an alternate power duration threshold received from load monitoring program 500. In some scenarios, power monitoring program 400 utilizes a power duration threshold from load monitoring program 500 based on one or more servers in an upper tier of the operational hierarchy of a group of servers of computing system 200. For example, server 240F thru server 240M support various functions of the same e-commerce application. Server 240M is at the top of the operational hierarchy of the e-commerce application and thereby dictates power duration threshold for server 240F thru server 240L. In other scenarios, power monitoring program 400 determines which internal power duration to utilize based on executing application information. For example, server 240I is configured to host software applications of various user (e.g., multitenancy) within the same runtime environment. In some embodiments, power monitoring program 400 does not shut down server 240I based on the shortest power duration threshold of the hosted software applications. Instead, power monitoring program 400 utilizes one or more shutdown protocols that operate at the application level as opposed to the server level, thereby pausing or shutting down software applications in preparation for gracefully shutting down server 240I.

Referring to decision step 416, in a further embodiment, power monitoring program 400 utilizes one or more override indications (e.g., dictates) received from load monitoring program 500 to determine whether a shutdown threshold is met. For example, the servers of computing system 200 support a software application with high transaction integrity requirements. Power monitoring program 400 receives a dictated server shutdown sequence from load monitoring program 500. The server shutdown sequence dictated by load monitoring program 500 may be power duration independent.

In decision step 416, responsive to determining that a power duration is not less than a shutdown threshold (no branch, decision step 416), power monitoring program 400 loops to step 402 to obtain status information for power sources and power loads.

Referring to decision step 416, responsive to determining that an internal power duration is less than a power duration threshold for a power load (yes branch, decision step 416), power monitoring program 400 initiates a shutdown protocol for an affected power load (step 418).

In step 418, power monitoring program 400 initiates a shutdown protocol for an affected power load. In one embodiment, power monitoring program 400 initiates an electronic shutdown (e.g., an e-shutdown) protocol by communicating directly, via network 110, with the affected power load of computing system 200. In one scenario, power monitoring program 400 initiates a graceful shutdown (e.g., a single protocol) of an affected power load. In another scenario, power monitoring program 400 communicates a shutdown protocol dictated by load monitoring program 500 for a given power duration threshold of a power load. In another embodiment, power monitoring program 400 communicates the identity and related shutdown protocol for a power load to computing system 200. Subsequently, computing system 200 initiates the shutdown protocol for the identified power load (e.g., server) of computing system 200.

Figure 5:
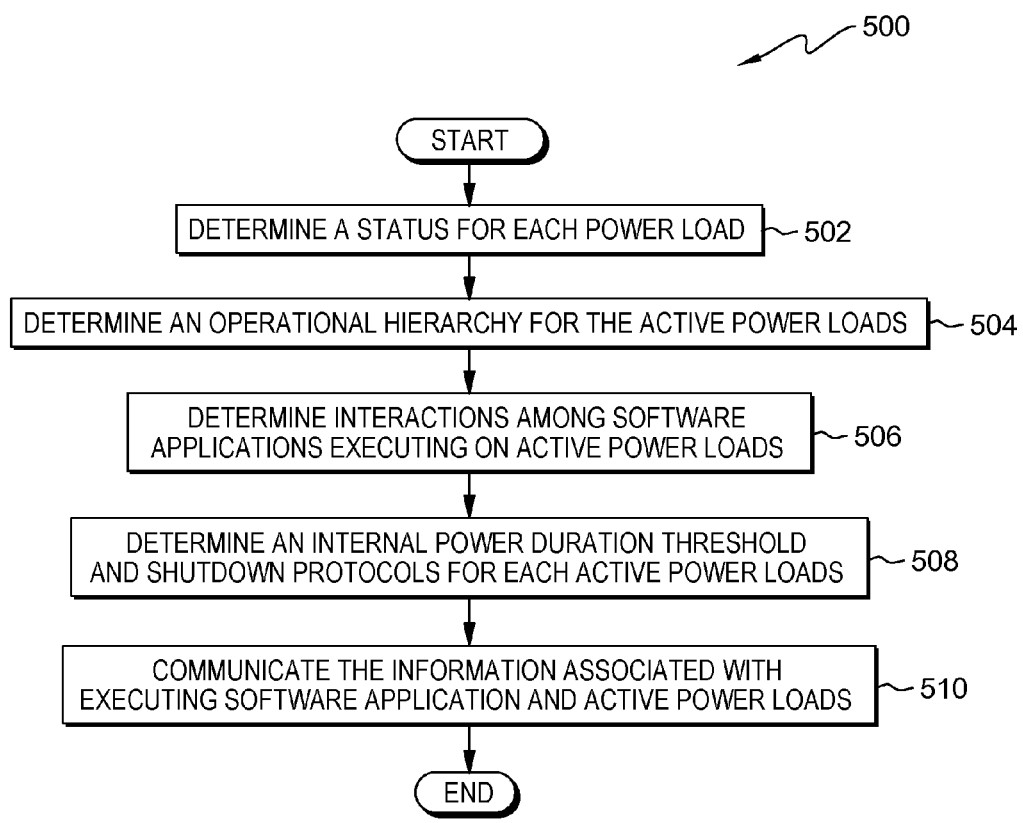
FIG. 5 depicts a flowchart of the operational steps of a load monitoring program, in accordance with an embodiment of the present invention.

FIG. 5 is a flowchart depicting operational steps for load monitoring program 500, a program for monitoring the status of power loads within a computing system that utilizes AC power, in accordance with embodiments of the present invention. In addition, load monitoring program 500 determines an operational hierarchy for the power loads within the computing system. In some embodiments, load monitoring program 500 also determines operational interactions among executing software applications that affect how active power loads (e.g., servers) shut down.

In step 502, load monitoring program 500 determines a status for each power load from information provided by power monitoring program 400. In an embodiment, load monitoring program 500 may receive status information that includes status information associated with one or more active power loads. In addition, load monitoring program 500 may query a power load history (not shown) to determine which of the one or more power loads have shut down. In some embodiments, load monitoring program 500 may query a power load history (not shown) to determine which of the one or more power loads were inactive when AC power failure occurred.

In step 504, load monitoring program 500 determines an operational hierarchy for the active power loads. In one embodiment, load monitoring program 500 may determine the operational hierarchy of a software application that distributed functionality among the power loads (e.g., servers) of computing system 200. For example, computing system 200 may be comprised of multiple web-servers (e.g., server 240B thru server 240F) obtaining information from a database server (e.g., server 240A). Load monitoring program 500 determines that a database server (server 240A) is above the web-servers (server 240B thru server 240F) in an operational hierarchy comprised of server 240A thru server 240F. In another embodiment, load monitoring program 500 may determine that the operational hierarchies of two or more software applications share a power load (e.g., a server). In some embodiments, load monitoring program 500 may utilize the business logic associated with a software application to determine the operational hierarchy of the active power loads.

In step 506, load monitoring program 500 determines interactions among software applications executing on active power loads. In one embodiment, load monitoring program 500 determines that one or more power loads are configured to host multiple software applications within the same runtime environment (e.g., multitenancy). In another embodiment, load monitoring program 500 may determine that multiple applications utilize one or more shared resources (e.g., databases, enterprise resource planning (ERP) system, etc.). For example, server 240M is an internal networking server, and server 240L is a domain name system (DNS). Users utilizing software applications executing on computing system 200 (e.g., on server 240G thru server 240K) communicate via network 110 with computing system 200. Subsequently, server 240L resolves the server names, identified within the software applications utilized by the users, to Internet Protocol address (IP address) which are utilized by server 240M to route users to the server hosting a utilized software application. In this example, servers 240L and 240M should remain active until server 240G thru server 240K complete transactions and shutdown to avoid the loss of user activities.

In step 508, load monitoring program 500 determines an internal power duration threshold and shutdown protocols for each of the active power loads. In one embodiment, load monitoring program 500 determines an internal power duration threshold and a shutdown protocol for an active power load. In another embodiment, load monitoring determines two or more internal power duration thresholds and one or more shutdown protocols for an active power load. In some embodiments, load monitoring program 500 may utilize internal power duration thresholds that are defined in a table or database. For example, a data center administrator may define and update the power duration thresholds utilized by load monitoring program 500. In one instance, a data center administrator may increase a power duration threshold based on a user request. In another instance, a data center administrator may create additional power duration thresholds based on whether a software application may execute on servers with different power usages. In another example, a user may define the power duration thresholds and shutdown protocols that load monitoring program 500 utilizes based on the knowledge that the user has of software applications that utilize one or more servers on computing system 200. In other embodiments, load monitoring program 500 may utilize an internal power duration threshold and shutdown protocols for similar software applications if a current software application does not have a defined internal power duration threshold and/or shutdown protocol.

In further embodiments, load monitoring program 500 may utilize operational hierarchies and/or interactions among software applications executing on power loads to determine internal power duration thresholds and shutdown protocols. In some embodiments, load monitoring program 500 may utilize override indications (e.g., commands, criteria, etc.) that dictate actions or shutdown protocols as opposed to waiting for an internal power duration threshold to occur.

In step 510, load monitoring program 500 communicates the information associated with executing software applications and active power loads to power monitoring program 400. The information communicated by load monitoring program 500 may include: internal power duration thresholds, shutdown protocols, operational hierarchies, software application interactions, and override indications. In some embodiments, load monitoring program 500 transmits the information associated with executing software applications and active power loads to power monitoring program 400 in real time. In other embodiments, load monitoring program 500 periodically transmits the information associated with executing software applications and active power loads to power monitoring program 400.

Figure 6:
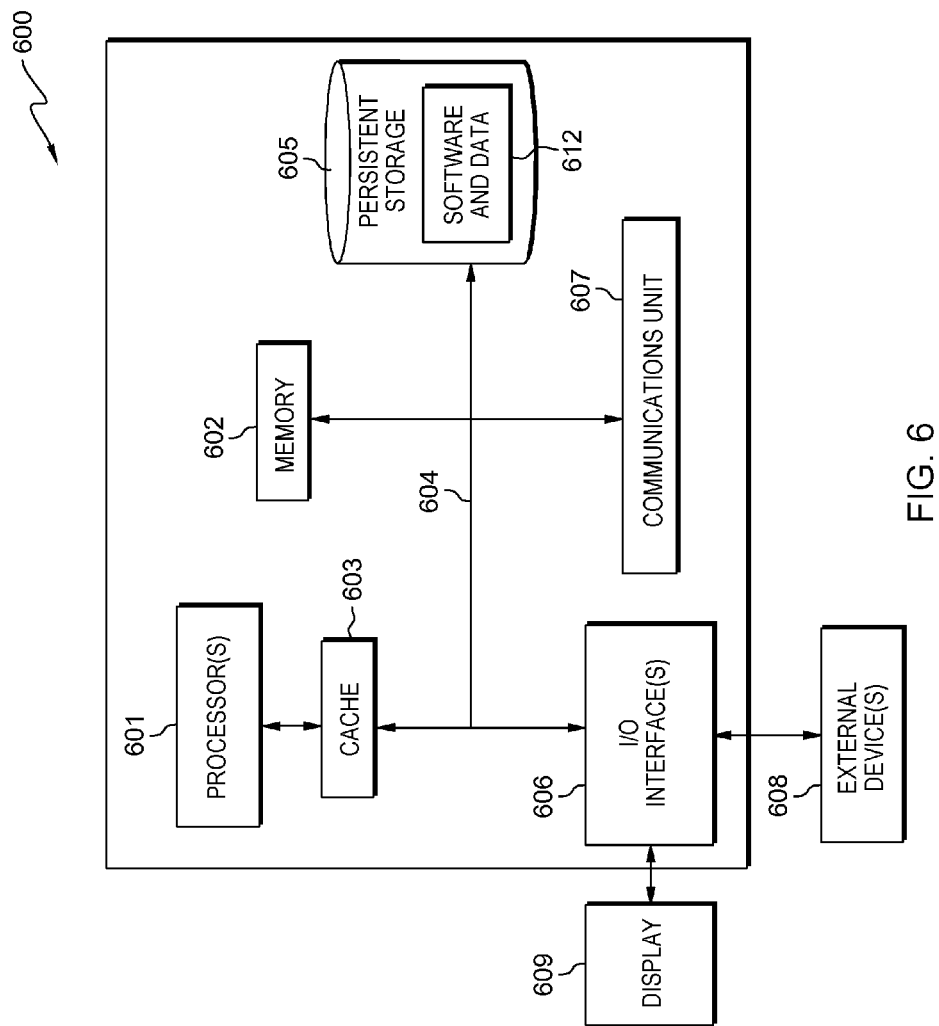
FIG. 6 is a block diagram of components of a computer, in accordance with an embodiment of the present invention.

FIG. 6 depicts computer system 600, which is representative of server 120, computing system 200, and server 240A thru server 240N. Computer system 600 may also represent components of an IPU, such as communication unit 302 and power mode unit 304. Computer system 600 is an example of a system that includes software and data 612. Computer system 600 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 are stored in persistent storage 605 for access and/or execution by one or more of the respective processor(s) 601 via cache 603 and one or more memories of memory 602. With respect to server 120, software and data 612 includes user interface (UI) 122, power monitoring program 400, load monitoring program 500, and resources (not shown) utilized by network 110 and computing system 200. With respect to computing system 200 and server 240A thru server 240N, software and data 612 includes a plurality of software programs and applications (not shown).

Communications unit 607, in these examples, provides for communications with other data processing systems or devices, including resources of server 120. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor. Display 609 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing backup power to power loads, the method comprising:
    identifying, by one or more computer processors, an indication of a power failure to a computing system;
    identifying, by one or more computer processors, a set of active power loads that are imposed on the computing system by a corresponding set of computing devices in the computing system, wherein the set of active power loads are affected by the identified power failure to the computing system;
    determining, by one or more computer processors, a set of interactions among one or more executing software applications that utilize the set of computing devices;
    responsive to identifying the indication of the power failure, activating, by one or more computer processors, a set of in-line power units (IPUs) that are connected to the set of active power loads, wherein the set of IPUs supplies power to the set of active power loads;
    identifying, by one or more computer processors, a power duration threshold corresponding to an active power load;
    determining, by one or more computer processors, whether a duration of power stored in one or more IPUs connected to the corresponding active power load is less than the identified power duration threshold of the corresponding active power load; and
    responsive to determining that the duration of power stored in one or more IPUs connected to the corresponding active power load is less than the identified power duration threshold of the corresponding active power load, automatically initiating, by one or more computer processors, a shutdown protocol on one or more computing devices of the set of computing devices corresponding to the set of active power loads, based, at least in part, on the determined set of interactions among the one or more executing software applications.

2. The method of claim 1, wherein the initiated shutdown protocol is a graceful shutdown.

3. The method of claim 1, further comprising:
    determining, by one or more computer processors, that the indication of the power failure to the computing system affects the active power load, wherein the active power load is connected to a rack distribution unit of the computing system, and wherein the identified power failure corresponds to a point-of-failure within the rack distribution unit; and
    activating, by one or more computer processors, the IPU connected to the corresponding active power load affected by the corresponding point-of-failure within the rack distribution unit.

4. The method of claim 1, further comprising:
    determining, by one or more computer processors, that a first software program utilizes two or more active power loads of the computing system;
    determining, by one or more computer processors, an operational hierarchy among the two or more active power loads of the identified set of active power loads ; and
    determining, by one or more computer processors, at least one power duration threshold, based, at least in part, on the operational hierarchy among the two or more active power loads.

5. The method of claim 4, further comprising:
    identifying, by one or more computer processors, a power duration threshold of the at least one power duration threshold that corresponds to initiating another shutdown protocol; and
    updating, by one or more computer processors, the identified power duration threshold of the at least one power duration threshold that corresponds to initiating the other shutdown protocol based on the operational hierarchy among the two or more active power loads, wherein the other shutdown protocol is comprised of one or more different shutdown protocols.

6. The method of claim 1:
    wherein an IPU is an apparatus integrated into a power cable; and
    wherein the IPU includes one or more elements selected from the group consisting of: a microcontroller, a communication unit, a direct current (DC) power storage device, and one or more power control devices.

7. The method of claim 6, wherein the communication unit of the IPU communicates with one or more devices selected from the group consisting of:
    one or more other IPUs, the active power load connect to the corresponding IPU, one or more other active power loads, the computing system, a network, and one or more other computing devices in the computing system.

8. The method of claim 1, wherein the set of interactions among one or more executing software applications that utilize the set of computing devices are selected from the group consisting of storing data, transferring data, performing transactions, initiating transactions, sharing resources, performing network functions, and communicating via a network.

9. The method of claim 1, wherein initiating the shutdown protocol on one or more computing devices of the set of computing devices corresponding to the set of active power loads, is based, at least in part, on the determined set of interactions among the one or more executing software applications further comprises:
    determining, by one or more computer processors, a hierarchy of interactions for the set of interactions among the one or more executing software applications; and determining, by one or more computer processors, a shutdown sequence for the one or more computing devices of the set of computing devices based on the determined hierarchy of interactions among the one or more executing software applications and the duration of power stored in the one or more IPU connected to the corresponding active power load.

10. The method of claim 9, wherein determining the shutdown sequence for the one or more computing devices of the set of computing devices based on the determined hierarchy of interactions among the one or more executing software applications and the duration of power stored in the one or more IPU connected to the corresponding active power load further comprising:
identifying, by one or more computer processors, another power duration threshold corresponding to the active power load based on the determined hierarchy of interactions among the one or more executing software applications; and
determining, by one or more computer processors, a shutdown protocol corresponding a computing device of the set of computing devices based on the determined hierarchy of interactions among the one or more executing software applications and the identified other power duration threshold corresponding to the active power load.

* * * * *